United States Patent
Grohman

(10) Patent No.: US 9,906,029 B2
(45) Date of Patent: Feb. 27, 2018

(54) PRIORITY-BASED ENERGY MANAGEMENT

(75) Inventor: Wojciech Grohman, Little Elm, TX (US)

(73) Assignee: Lennox Industries Inc., Richardson, TX (US)

( * ) Notice: Subject to any disclaimer, the term of this patent is extended or adjusted under 35 U.S.C. 154(b) by 882 days.

(21) Appl. No.: 13/326,644

(22) Filed: Dec. 15, 2011

(65) Prior Publication Data

US 2012/0153725 A1 Jun. 21, 2012

Related U.S. Application Data

(60) Provisional application No. 61/423,754, filed on Dec. 16, 2010.

(51) Int. Cl.
*H02J 4/00* (2006.01)
*H02J 3/14* (2006.01)
*H02J 13/00* (2006.01)

(52) U.S. Cl.
CPC .......... *H02J 3/14* (2013.01); *H02J 13/0006* (2013.01); *H02J 2003/143* (2013.01); *H02J 2003/146* (2013.01); *Y02B 70/3225* (2013.01); *Y02B 70/3266* (2013.01); *Y04S 20/222* (2013.01); *Y04S 20/224* (2013.01); *Y04S 20/242* (2013.01); *Y10T 307/469* (2015.04)

(58) Field of Classification Search
CPC .... H02J 3/14; H02J 13/0006; H02J 2003/143; H02J 2003/146; Y02B 70/3225; Y02B 70/3266; Y04S 20/222; Y04S 20/224; Y04S 20/242; H01R 25/003; G06F 1/266; Y10T 307/469

USPC .......... 307/38, 39, 52, 53, 29; 700/274, 276, 700/290, 300, 101, 286, 287, 291, 292, 700/295, 296

See application file for complete search history.

(56) References Cited

U.S. PATENT DOCUMENTS

| | | | | |
|---|---|---|---|---|
| 5,058,388 | A * | 10/1991 | Shaw et al. | 62/93 |
| 6,772,052 | B1 * | 8/2004 | Amundsen | H02J 3/14 307/35 |
| 7,010,363 | B2 * | 3/2006 | Donnelly et al. | 700/19 |
| 7,373,222 | B1 * | 5/2008 | Wright | H02J 3/14 700/20 |
| 8,352,080 | B2 | 1/2013 | Grohman et al. | |
| 8,543,250 | B2 * | 9/2013 | Seo | G01D 4/004 700/22 |
| 9,175,867 | B2 | 11/2015 | Grohman | |
| 2001/0010032 | A1 * | 7/2001 | Ehlers et al. | 702/62 |
| 2001/0019321 | A1 * | 9/2001 | Brooksby et al. | 345/87 |
| 2001/0030468 | A1 * | 10/2001 | Anderson | H02J 3/14 307/31 |
| 2004/0153170 | A1 * | 8/2004 | Santacatterina | H02J 3/14 700/1 |
| 2004/0254654 | A1 * | 12/2004 | Donnelly et al. | 700/22 |
| 2005/0060700 | A1 * | 3/2005 | Bucher | H04L 67/1095 717/176 |
| 2005/0143865 | A1 * | 6/2005 | Gardner | H02J 3/14 700/291 |

(Continued)

*Primary Examiner* — Thienvu Tran
*Assistant Examiner* — Brian K Baxter
(74) *Attorney, Agent, or Firm* — Winstead PC

(57) ABSTRACT

A system for controlling operation of a plurality of appliances includes first and second appliances. The first appliance is configured to report a power consumption via a network. A second appliance is configured to operate dependent on the power consumption reported by the first appliance.

18 Claims, 6 Drawing Sheets

(56) References Cited

U.S. PATENT DOCUMENTS

| | | | |
|---|---|---|---|
| 2006/0095164 A1* | 5/2006 | Donnelly et al. ............. 700/295 |
| 2007/0220907 A1* | 9/2007 | Ehlers ............................. 62/126 |
| 2007/0260359 A1* | 11/2007 | Benson ..................... H02J 3/14 |
| | | | 700/297 |
| 2008/0110187 A1* | 5/2008 | Han et al. ...................... 62/159 |
| 2009/0234511 A1* | 9/2009 | Ouchi ....................... H02J 3/14 |
| | | | 700/291 |
| 2009/0261767 A1* | 10/2009 | Butler et al. .................. 318/445 |
| 2010/0019574 A1* | 1/2010 | Baldassarre et al. ........... 307/23 |
| 2010/0070091 A1* | 3/2010 | Watson et al. ................ 700/278 |
| 2010/0092625 A1* | 4/2010 | Finch et al. ................... 426/231 |
| 2010/0101254 A1* | 4/2010 | Besore et al. .................. 62/264 |
| 2010/0121499 A1* | 5/2010 | Besore et al. ................ 700/295 |
| 2010/0191487 A1* | 7/2010 | Rada .......................... G05F 1/70 |
| | | | 702/60 |
| 2010/0235008 A1* | 9/2010 | Forbes, Jr. ............. G06Q 10/00 |
| | | | 700/291 |
| 2011/0118924 A1* | 5/2011 | Nasu et al. ..................... 701/22 |
| 2011/0148360 A1* | 6/2011 | Lee ............................... 320/134 |
| 2011/0148390 A1* | 6/2011 | Burt et al. .................... 323/318 |
| 2011/0153106 A1* | 6/2011 | Drake ....................... H02J 3/14 |
| | | | 700/295 |
| 2011/0153110 A1* | 6/2011 | Drake ................. A47L 15/0047 |
| | | | 700/296 |
| 2011/0172836 A1* | 7/2011 | Boss ........................ G01D 4/00 |
| | | | 700/291 |
| 2011/0172837 A1* | 7/2011 | Forbes, Jr. ............. G06Q 10/00 |
| | | | 700/291 |
| 2011/0172841 A1* | 7/2011 | Forbes, Jr. ............. G01D 4/004 |
| | | | 700/292 |
| 2011/0184579 A1* | 7/2011 | Nilsen ...................... H02J 3/14 |
| | | | 700/295 |
| 2011/0202185 A1* | 8/2011 | Imes ....................... H04L 43/08 |
| | | | 700/277 |
| 2011/0251731 A1* | 10/2011 | Yang et al. .................... 700/296 |
| 2011/0282504 A1* | 11/2011 | Besore ..................... H02J 3/14 |
| | | | 700/291 |
| 2011/0298285 A1* | 12/2011 | Lim et al. ....................... 307/41 |
| 2011/0313585 A1* | 12/2011 | Park ........................ H02J 3/14 |
| | | | 700/295 |
| 2011/0320828 A1* | 12/2011 | Boss ..................... G06F 1/3209 |
| | | | 713/300 |
| 2012/0064923 A1* | 3/2012 | Imes ................. G05D 23/1919 |
| | | | 455/457 |
| 2012/0109395 A1* | 5/2012 | Finch et al. ................... 700/295 |
| 2012/0173029 A1* | 7/2012 | MacLellan ............. G06Q 50/06 |
| | | | 700/291 |

* cited by examiner

PRIORITY-BASED ENERGY MANAGEMENT

CROSS-REFERENCE TO RELATED APPLICATION

This application claims the benefit of U.S. Provisional Application Ser. No. 61/423,754, filed by Wojciech Grohman on Dec. 16, 2010, entitled "Priority-Based Energy Management," commonly assigned with this application and incorporated herein by reference.

TECHNICAL FIELD

This application is directed, in general, to systems and methods for managing power-consuming devices connected to an electric utility grid.

BACKGROUND

Power generation and distribution infrastructure are finite resources. Often, sufficient power generating capacity is made available to a power distribution grid to meet peak power demand requirements within the grid. When the power demand is less than the peak demand, some of the excess power generating capacity may be idled. In some cases, such as when power generation capacity is needed to meet a peak seasonal load, such excess capacity may be idled for several months of the year. The capital cost associated with the idled excess capacity is spread among the power consumers on the grid throughout the year, increasing the overall cost of power delivery.

New methods and systems are needed to reduce the peak power demands on a power gird grid, and to otherwise reduce variation e.g. seasonal variation, of power demand to reduce the cost of providing excess capacity to meet peak demand requirements.

SUMMARY

One embodiment provides a system for controlling operation of a plurality of networked appliances. The system includes first and second appliances. The first appliance is configured to report a power consumption via a network. A second appliance is configured to operate dependent on the power consumption reported by the first appliance.

Another embodiment provides a method of manufacturing a network of appliances. The method includes configuring a first appliance to report a power consumption via a communication path. The method further includes configuring a second appliance to operate dependent on the power consumption reported by the first appliance.

Yet another embodiment provides a load controller for controlling a networked plurality of appliances. The load controller includes a processor configured to execute program instructions stored by a program memory. The memory includes instructions for executing a priority calculation module. The priority calculation module operates to calculate operating priorities of first and second networked appliances. The processor is further configured to control the operation of the first and second networked appliances based on the operating priorities.

BRIEF DESCRIPTION

Reference is now made to the following descriptions taken in conjunction with the accompanying drawings, in which:

FIG. 1 illustrates a system in one illustrative and nonlimiting embodiment, in which various appliances, or loads, operate within a structure, wherein the operation is managed, e.g. according to an operating priority of each load to achieve desired aggregate power consumption characteristics within the structure;

FIG. 2 presents a functional block diagram of a controller, e.g. a load manager of FIG. 1;

DETAILED DESCRIPTION

This disclosure benefits from the recognition by the inventor that emerging technologies that provide communication between electrical loads within a residential or commercial structure may be beneficially applied to manage the operation of the loads. Load management may include algorithms that by dynamically adjusting priorities can restrict the simultaneous operation of multiple loads to enforce an aggregate power budget of the loads. Moreover, the impact of the load operation on a grid supplying power to the loads, and the cost of operating the loads, may be reduced relative to unrestricted operation. Such management offers the potential to reduce the need for peak power generation capacity and to lower the maximum peak power for which a power distribution grid is designed to operate.

Figure 1:
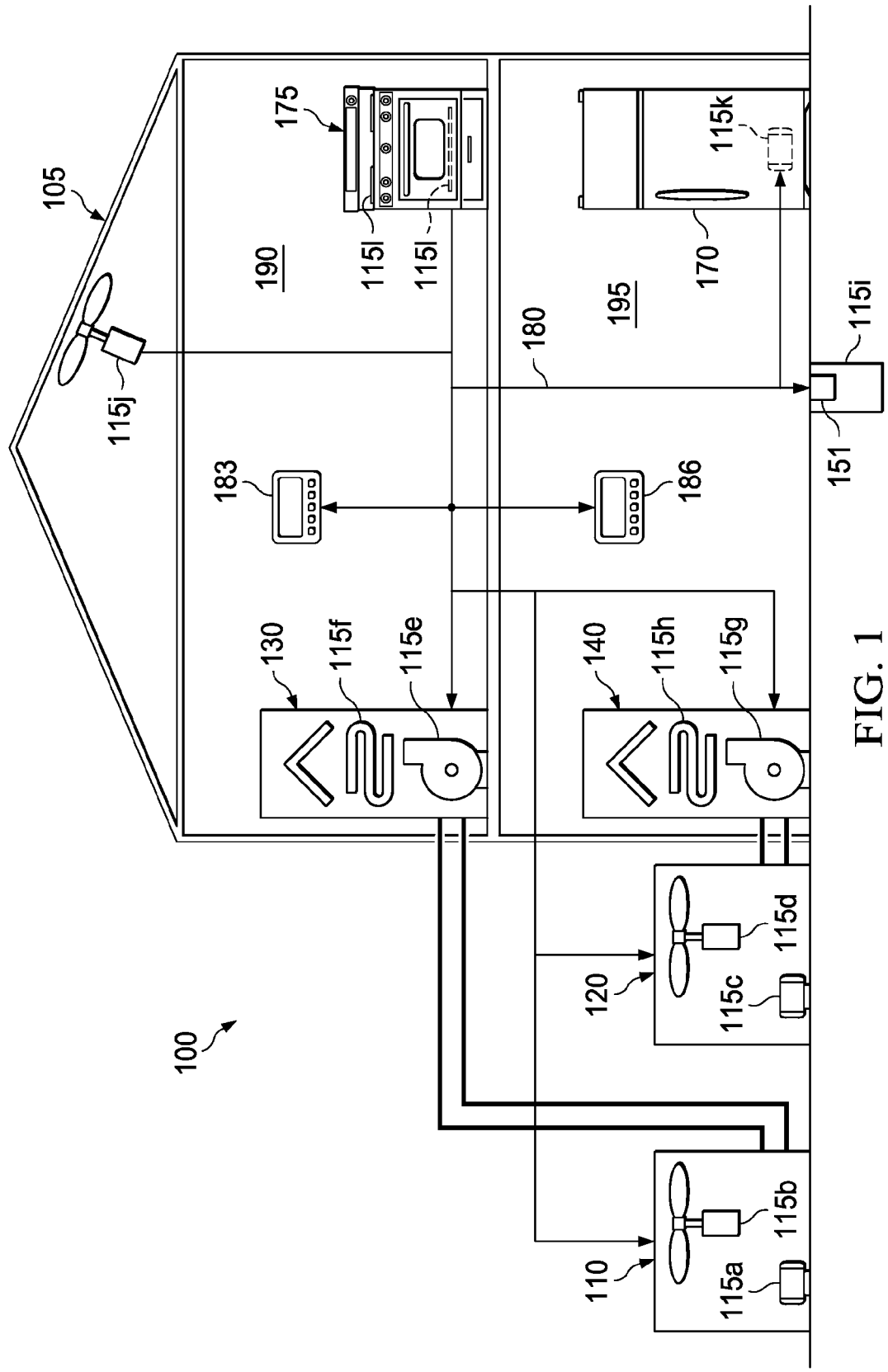

FIG. 1 illustrates an embodiment of a system 100 of the disclosure in which a load manager coordinates the operation of a number of electrical loads, generally referred to as appliances. Herein an appliance is a device that operates using AC power locally generated or delivered via an electric utility grid, wherein the device provides a service, such as heating or performing work. For example, the appliance may be a motor that drives a compressor, a fan, a blower or a pump, or may be a heat generating device such as a heating coil of a furnace, oven stove or dryer. The appliances draw power from a power source that supplies electrical power to a structure 105, e.g. a residential structure. In various embodiments the power source is a power grid, but the principles described herein may be applied to other sources such as a local generator, renewable power source, or other energy delivery types, such as DC voltage systems. As described further below, the coordination includes prioritization of operation of the appliances to meet at least one power consumption objective. Examples of power consumption objectives include minimizing variation of an aggregate power consumption, or load, of the system 100, reducing a peak power consumption of the aggregate of all loads within the system 100, and reducing an overall cost of operation of the appliances within the system 100.

The system 100 is illustrated without limitation as being contained within a residential structure 105. It will be immediately apparent to those skilled in the pertinent art that the principles of the disclosure may be applied to other aggregates of power loads, such as commercial buildings and manufacturing facilities.

An outdoor HVAC unit 110 (hereinafter "outdoor unit 110") includes a compressor motor 115a and a fan motor 115b. Similarly, an outdoor HVAC unit 120 (hereinafter "outdoor unit 120") includes a compressor motor 115c and a fan motor 115d. One or both of the HVAC units 110, 120 may be a heat pump system. The outdoor unit 110 operates with an associated indoor unit 130 that includes a blower motor 115e and a heating coil or furnace 115f. The outdoor unit 120 operates with an associated indoor unit 140 that includes a blower motor 115g and a heating coil or furnace 115h. The structure 105 may also include appliances other than those providing HVAC services, exemplified by a sump pump motor 115i, an attic fan motor 115j, a refrigerator 170 including a compressor 115k, and an oven/range 175 having heating elements 115l. Various ones of the appliances are primarily inductive loads, e.g. the aforementioned motors. Other ones of the appliances are primarily resistive loads, e.g. the heating coils 115f, 115h and the heating coils 115l. The various motors and heating elements are referred to collectively as appliances 115.

Some of the illustrated appliances are configured to provide HVAC services to first and second conditioned spaces 190 and 195. For example, the outside unit 110 and the inside unit 130 provide heating and/or cooling to the first conditioned space 190, and the outside unit 120 and the inside unit 140 provide heating and/or cooling to the second conditioned space 195. Those skilled in the pertinent art will appreciate that the illustrated configuration of the appliances 115 is illustrative and does not limit embodiments of the invention to any particular configuration.

The structure 105 also includes a communication network, or path, 180. The communication network 180 interconnects the various appliances within the structure 105. The communication network 180 may be implemented by any conventional or novel wired or wireless communication protocol or any combination of thereof. For the purpose of illustration without limitation, the protocol may include any revision of the following: a universal serial bus (USB), IEEE 1394 (Firewire™), Thunderbolt™, RS-232, IEEE 802.3 or the Ethernet, any of the IEEE 802.15.4-based protocols, such as Zigbee, Z-wave, 802.11a/b/g/n, the suite of communication standards commonly referred to as the "internet", wired or wireless LAN, Power Line Carrier (PLC) technology, such as in the emerging standards IEEE 1901-2010, IEEE P1901.2, IEEE P1905, or a serial bus conforming to the TIA/EIA-485 standard or the Bosch CAN (controller area network) standard. Without limitation, one embodiment of such a network is provided in U.S. patent application Ser. No. 12/603,526 to Grohman, et al., incorporated herein by reference.

Load managers 183, 186 operate on the communication network 180 to coordinate operation of the various appliances 115. Each of the appliances includes the capability to communicate with one or both of the load mangers 183, 186 via the communication network 180. In one aspect one or both of the load managers 183, 186 provides typical HVAC functions, such as providing a means to select a temperature setpoint of the respective conditioned spaces 190, 195. In some cases one or both load managers 183, 186 may communicate outside the structure 105, such as to report various aspects of operation within the structure 105 to an outside entity, or to receive communications that may include a power consumption objective, such as a maximum permitted aggregate power usage within the structure 105.

In some embodiments the load managers 183, 186 are configured to provide similar functionality within the system, 100, and may be multiple instances of nominally identical units. For brevity the remaining discussion may describe certain features of one or both load managers 183, 186 by referring to only one of the units. In such cases, it is understood that such features may also be provided by the other of the units. It is understood that the number of load managers is not limited and can be substantially higher than two in any given residential, industrial or commercial location. It is also understood that the load managers can be physically separated from any HVAC equipment and only connected to the equipment via a communication network, such as the network 180.

The load managers 183, 186 may include a processing capability, e.g. a memory and a processor. In some embodiments one or both load managers 183, 186 coordinate the operation of the several appliances in addition to those appliances providing HVAC services. In other embodiments one or more of the appliances includes a distributed control capability, such as by a local load manager (LLM) 151 associated with the sump pump motor 115i. In some embodiments each of the appliances 115 includes an instance of the LLM 151. Such local controllers may include the ability to control the operation of other appliances 115 within the system 100, but typically do not include aspects of HVAC operation such as temperature setpoint entry and display. Features of the load managers 183 and 186 described herein may be present in the LLM 151 unless otherwise stated.

The load managers 183, 186 and/or 151 may include any combination of hardware, such as microcontrollers, volatile and nonvolatile memory, sensors and communications interfaces necessary to execute the predictive and control functions. Configuration may include software in any form stored in memory, including machine-level coding and higher level coding languages such as C, C++, C# and Java. Some embodiments are described by, e.g. U.S. patent application Ser. No. 12/857,685 to Grohman (hereinafter the '685 application), incorporated herein by reference in its entirety. Another embodiment is described in FIG. 2, below.

Figure 2:
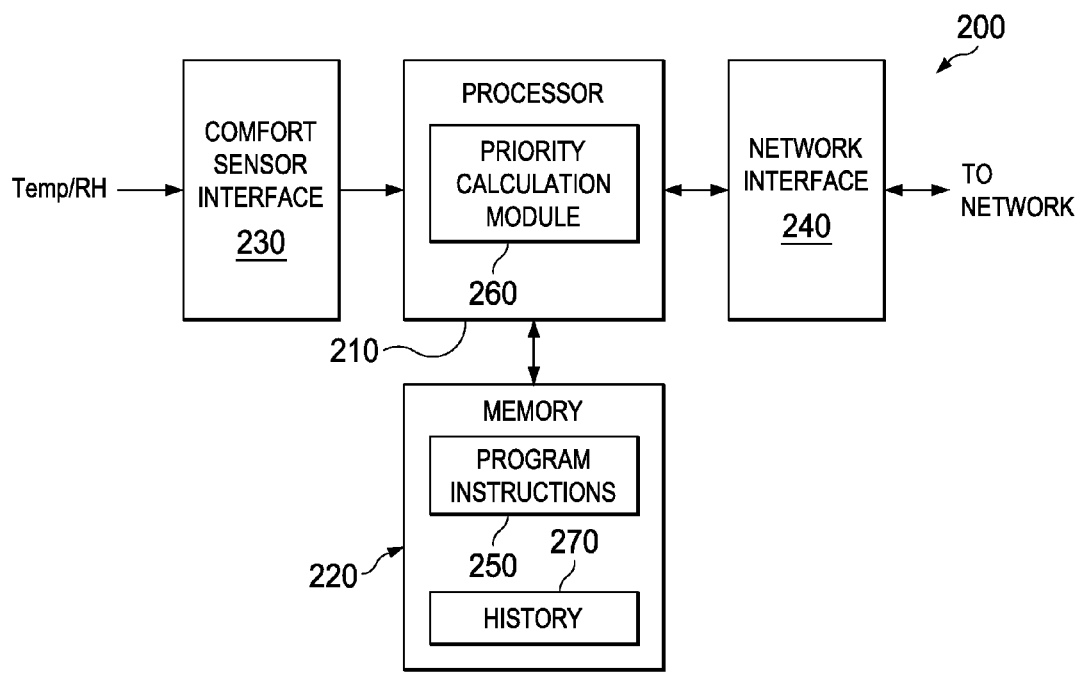

FIG. 2 illustrates a load manager 200 configured to provide the described control of the system 100 according to various embodiments of the disclosure. The load manager may describe aspects of each of the load managers 183, 186 and 151. The load manager 200 includes a processor 210, a memory 220, and a network interface 240. It may optionally also include a comfort sensor (CS) interface 230. Those skilled in the art will appreciate the division of functionality between these modules may be allocated in a different manner than described herein and remain within the scope of the invention.

The processor 210 may be any type of electronic controller, e.g. a general microprocessor or microcontroller, a digital signal processor (DSP), an ASIC device configured to implement controller functions, a state machine, etc. Similarly the memory 220 may be any type or memory, e.g. static random access memory (SRAM), dynamic random access memory (DRAM), programmable read-only memory (PROM), flash memory, magnetic memory, and the like. The optional CS interface 230 may be any configuration of electronic devices configured to communicate with a temperature sensor and/or a humidity sensor to provide feedback for HVAC temperature and humidity conditioning. Similarly, the network interface 240 may be any configuration of electronic devices configured to communicate with the other entities in the system 100, either by wired or wireless networking as previously described.

The memory 220 provides program instructions 250 to the processor 210 that guide overall operation of the system 100, including various conventional functions. More specifically, the instructions 250 provide instructions to implement a priority calculation module 260 that operates according to various embodiments described herein below to calculate, e.g. operating priorities of appliances 115, power consumption metrics of the system 100 and/or an efficiency map that characterizes a total power consumption of the system 100 based on the calculated operating priorities. The memory 220 may also include a performance history portion 270 that stores historical performance data to support calculations of the various power consumption characteristics and the efficiency maps as described herein.

The load managers 183, 186 and/or local load managers such as the LLM 151, collectively referred to as load managers, are configured to perform various predictive and control tasks described herein. Only one load manager is required within the system 100 to perform such tasks. When multiple load managers are present, such as the illustrated embodiment, the load managers may negotiate to select a master load manager, e.g. as described in U.S. patent application Ser. No. 12/603,526 to Grohman, et al. (the '526 application), incorporated herein by reference in its entirety. In some embodiments described below the load controller 183 operates as a master load manager. In the discussion below reference to a load manager assumes it is a master load manager unless otherwise stated.

Each appliance may report at least its instantaneous power consumption to the master load manager, e.g. the load manager 183. The reported power consumption may be an estimated value, such as a preset parameter retained by the reporting appliance. For example, the blower motor 115e may report nominal or expected power consumption under current working conditions, e.g. 500 W. Alternatively or in combination, each appliance may repot an actual current or voltage and current, to the master load manager.

In various embodiments the (master) load manager 183 coordinates the operation of the various appliances. More specifically, the load manager 183 prioritizes the operation of the appliances 115 to meet a power consumption objective. In various embodiments the prioritization supports the objectives of 1) reducing peak power consumption of the various appliances within the structure 105, and 2) reducing variation of the total power consumed within the structure 105, as viewed from the power source. The total power consumed may be equivalently referred to herein and in the claims as aggregate power consumption.

The priority of each appliance is dynamic, meaning the priority of each appliance 115 may change over time, for example, to reflect a change of its local environment, and hence that appliance's need to respond thereto. For example, outside air temperature (OAT) may increase, placing a greater cooling load appliances 115 associated with HVAC functions. The priority of one appliance 115 relative to the priority of another appliance 115 may also change dynamically as each appliance adjusts its priority.

In some cases the priority of a particular appliance 115 is determined and/or stored locally by that appliance 115. For example, the LLM 151 may be configured to store a priority of the sump pump motor 115i, and may report the priority to other appliances via the communication network 180. The LLM 151 may further be configured to modify the priority of the sump pump motor 115i to reflect conditions of the sump pump motor 115i that are detected locally but not necessarily reported over the communication network 180. For example, as discussed further below the priority of the sump pump motor 115i may increase as a water level in a sump drained by the sump pump motor 115i increases. In another example priority of HVAC appliances may increase as a departure of an indoor air temperature (IAT) from a setpoint temperature increases.

FIGS. 3A-3D illustrate embodiments of priority functions that may be used by an appliance 115 of the disclosure. These functions are representative of prioritization functions that may be used by any of the appliances 115 in the system 100, and represent different design choices reflecting the role of the particular appliance 115. In these figures, the vertical axis represents the dynamic priority of the appliance 115. The horizontal axis represents a deviation from a desired operating setpoint, wherein a dashed vertical line represents a reference at which the appliance 115 is operating at a desired operating setpoint. Increasing distance to the right of the reference line indicates greater positive deviation $\Delta T$ from the operating setpoint, while deviation to the left indicates increasing negative deviation $\Delta T$ from the operating setpoint. It will be immediately apparent to one skilled in the pertinent art that the prioritization functions may be configured to increase a priority when the deviation from a setpoint is negative. The prioritization functions are illustrative and not exclusive of other prioritization functions within the scope of the disclosure. The shape of the functions can change significantly over time as a result of change of conditions, either external or internal to the device, and may be viewed as temporary (or instantaneous) snapshots of the prioritization functions at any given time.

Figure 3A:
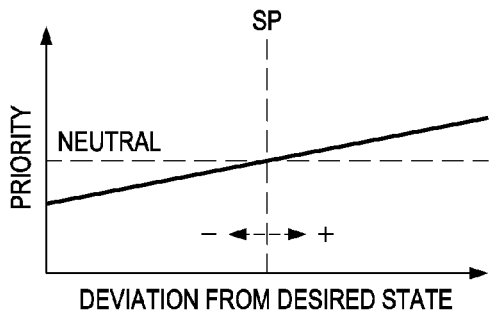
FIGS. 3A-3D illustrate examples of priority functions that may be used by various loads within the system of FIG. 1.

FIG. 3A illustrates, e.g. an IAT setpoint SP associated with the conditioned space 190 at a particular instant of time when the HVAC system is cooling the space. The SP represents a temperature at a given time, as defined by the cooling schedule for the space, above which the outside unit 110 should operate to cool the conditioned space 190. A positive deviation of the priority occurs when the IAT is greater than the SP, and a negative deviation occurs when the IAT is less than the SP. In this example the priority is linearly related to the temperature deviation $\Delta T$.

Figure 3B:
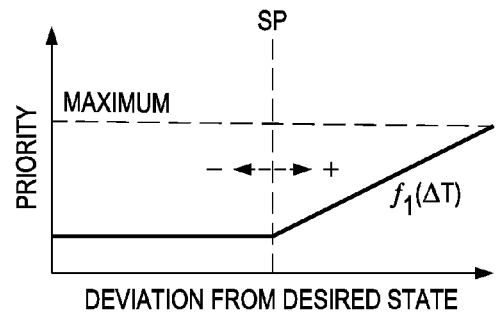

FIG. 3B illustrates a prioritization function $f_1(\Delta T)$ in which the priority increases linearly in proportion to the deviation $\Delta T$ of the IAT from the SP, up to a maximum priority, e.g. 100%. For instance, if the temperature within the conditioned space 190 were to increase above the temperature setpoint for that zone, the priority of the outdoor unit 120 for allocation of power may increase in proportion to the deviation of the temperature from the setpoint. However, below the setpoint the priority remains constant.

Figure 3C:
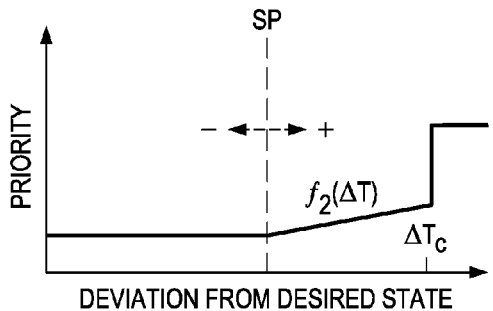

FIG. 3C illustrates a prioritization function $f_2(T)$ that increases linearly above SP until the temperature deviation reaches a critical value, e.g. a critical temperature difference $\Delta T_c$. Above $\Delta T_c$ the priority is a maximum value, e.g. 100%. The slope of the prioritization function, $f_2'(T)$, is discontinuous at $\Delta T_c$. For example, the function $f_2(T)$ may be used by the compressor 115k, for which $\Delta T_c$ represents a temperature above which food within the refrigerator 170 spoils. Thus, immediate allocation of power to the refrigerator 170 may be required to avoid such spoilage.

Figure 3D:
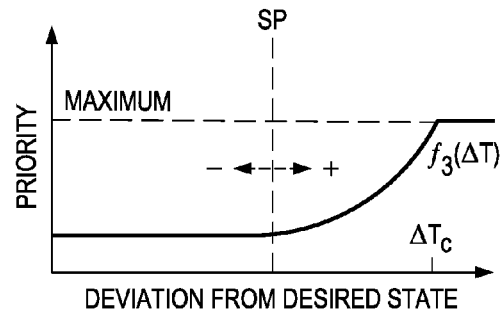

FIG. 3D illustrates a prioritization function $f_3(T)$ that increases nonlinearly above SP. The function $f_3(T)$ is representative of embodiments in which an appliance 115 may respond "intelligently" to a deviation from a setpoint. In the current example, the function $f_3(T)$ may reflect a nonlinear or subjective discomfort experienced by a person within the conditioned space 190. For instance if the temperature and the humidity within the conditioned space 190 increase simultaneously, the temperature perceived by an occupant may be nonlinear. The function $f_3(T)$ may also reflect a temperature prediction received by the load manager 183 as discussed further below. The slope of the function $f_3(T)$ is discontinuous at $\Delta T_c$.

Each of the appliances 115 in the system 100 may be subject to a prioritization function such as those exemplified in FIGS. 3A-3D. The prioritization function may be physically embodied anywhere within the system 100. For instance, in some embodiments the load manager 183 may include control algorithms that include the prioritization function for any one or more of the appliances 115 in the system 100. In a more specific example, the oven/range 175, may report a local parameter such as a temperature setpoint and a current temperature to the load manager 183 from which the load manager 183 computes the priority of the oven/range 175. In another embodiment the temperature setpoint associated with an appliance 115, such as HVAC-related appliances, is entered at the load manager 183. The load manager 183 may compute the priority of such appliances from the entered values.

In some embodiments, the prioritization function is physically embodied at the appliance 115 with which the prioritization function is associated. Thus, for example, the LLM 151 may include functionality to determine its priority level from a locally reported parameter such as water level. The LLM 151 may then report its priority to an arbitrator such as the load manager 183.

Figure 4:
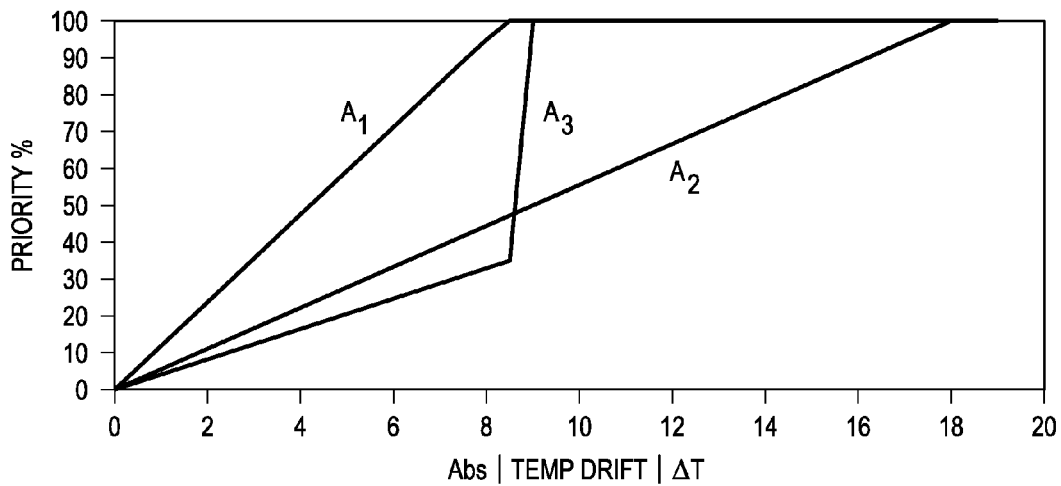
FIG. 4 illustrates without limitation example priority functions of three appliances having different sensitivities to deviations from an operating setpoint.

FIG. 4 illustrates an embodiment in which three appliances $A_1, A_2, A_3$ each have an associated priority function. The appliance $A_1$ has a priority $P_1 = C_1 \Delta T$, where $C_1$ is a coefficient that determines the sensitivity (slope) of the priority function. The second appliance $A_2$ has a priority $P_2 = C_2 \Delta T$. In the illustrated example $C_1 > C_2$, such that the priority of $A_1$ is more sensitive to $\Delta T$ than is the priority of $A_2$. The sensitivity of the priority function need not be constant. The appliance $A_3$ has a priority $P_3 = C_3 \Delta T$ when $\Delta T < 9°$ F. (5° C.) and $P_3 = 100\%$ when $\Delta T \geq 9°$. $C_3$ is less than both $C_1$ and $C_2$, indicating that $A_3$ is less sensitive to $\Delta T$ until $\Delta T = 9°$. When $\Delta T > 9°$, $C_3$ is greater than both $C_1$ and $C_2$ indicating that $A_3$ is more sensitive to $\Delta T$ in this temperature difference range. However since the combined slope $C_3$ is less than the slope of $C_1$, appliance $A_1$ actually reaches the maximum priority at a lower temperature drift than appliance $A_3$ which underlines the complexity of different permutations possible.

Figure 5:
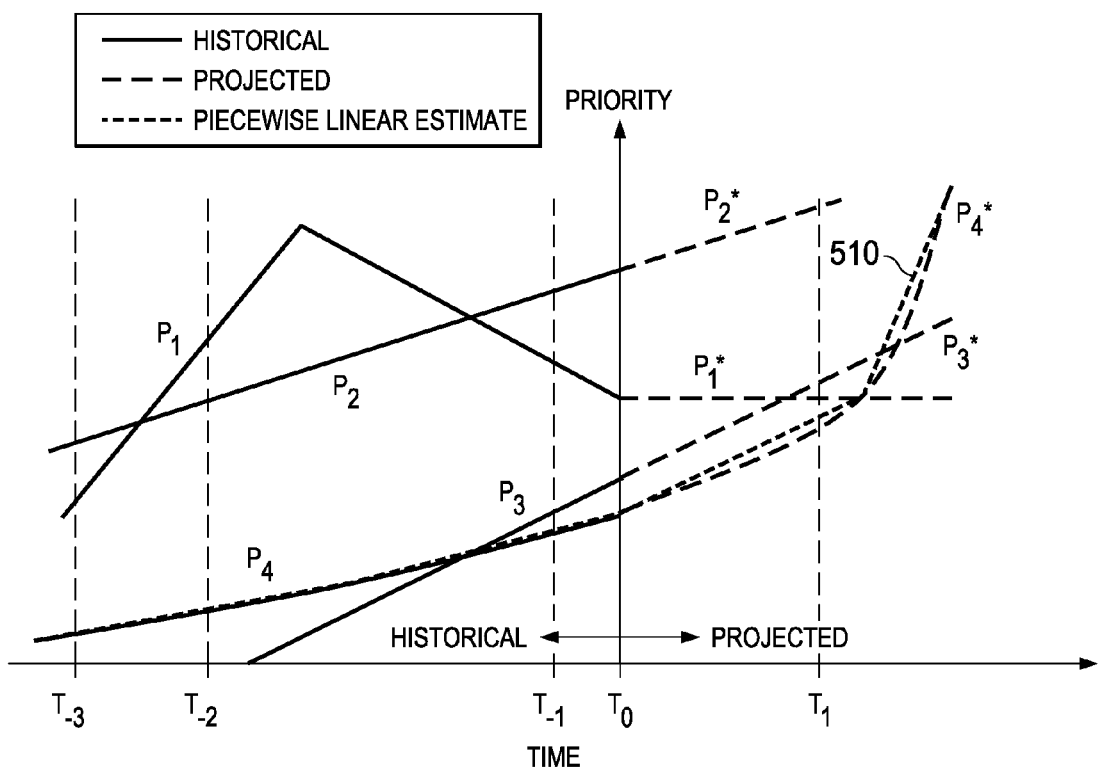
FIG. 5 illustrates priority functions of several generalized loads, including historical and estimated priorities.

FIG. 5 illustrates priority functions for each of a set of appliances $A_1, A_2, A_3, A_4$ in the time domain. Corresponding functions $P_1, P_2, P_3$ and $P_4$ describe historical priority up to current time $T_0$. Corresponding functions $P_1^*, P_2^*, P_3^*$ and $P_4^*$ describe predicted priority after $T_0$. A solid line segment denotes historical priority data, and a long-dash dotted line segment indicates the predicted priority. The value of each priority function is the instantaneous priority of the corresponding appliance at $T_0$.

Each appliance of the set may have an independent and unique operating setpoint. The operating setpoint may be, e.g., with respect to temperature, humidity, water level or time of day. Each appliance $A_1, A_2, A_3, A_4$ may have a different priority function, but embodiments are not so limited. For example, the appliances $A_1$ and $A_2$ may have a same priority function that results in a different instantaneous priority for these appliances because the appliances $A_1$ and $A_2$ operate under different conditions.

Prioritization, or priority order, is the order of appliance priorities at a particular instant in time. The illustrated example shows several possible outcomes of prioritization of the set of appliances. At a time $T_{-3}$ the priority order is $P_2 > P_1 > P_4 > P_3$. At a time $T_{-2}$, $P_1 > P_2 > P_4 > P_3$, and at a time $T_{-1}$, $P_2 > P_1 > P_3 > P_4$. As seen in this example, the priority of a particular appliance is dynamic with respect to both its own priority and with respect to that appliance relative to the priority of the other appliances. Prioritization may be a predicted prioritization when determined from predicted priority functions. For example, at a time $T_1$ the predicted priority order is $P_2 > P_3 > P_1 > P_4$.

The priority $P_4$ of the appliance $A_4$ also illustrates an example of a feature referred to herein as intelligent prioritization. (See also FIG. 3D and related discussion, supra.) The form of $P_4$, illustratively a curve for which $P_4''$ (the second derivative with respect to time) increases with increasing time, may reflect various computations the appliance $A_4$ performs to determine its priority. As described further below, in some embodiments the appliance $A_4$ may employ predictive load and/or cost models to compute its priority. In some embodiments the load manager 183 may determine the priority for each appliance in the system 100, including determining the priority of the appliance $A_4$ to meet a system-level constraint such as maintaining an aggregate power load less than a maximum assigned to the system 100 by a supplying utility, or to take into account peak-period power pricing. Such predictive prioritization will in general yield a priority function with an arbitrary form.

In an embodiment, an appliance may report its requested priority to the load manager 183 by a piecewise-linear function. For example, the priority function $P_4$ may be reported by the appliance $A_4$ as a piecewise-linear function 510, illustrated as short-dashed line segments. The function 510 may be communicated with fewer data points, thereby reducing the bandwidth on the communication network 180 used for such purposes.

In various embodiments the appliances estimate their future priority function and report the estimate to the load manager 183. The load manager 183 may then determine a predicted priority order. In some cases one or more appliances may report a local environmental condition such as OAT and/or local IAT to the load manager 183 to support an estimate determined by the load manager 183. For example, the load manager 183 may predict a required load on an HVAC component based on the IAT and/or OAT, and determine the prioritization based on the priority function and predicted load of that component.

The load manager 183 may arbitrate among various appliances to allocate power thereto given the level of criticality determined for each appliance from its associated prioritization function and, in some embodiments, the total power budget available.

The load manager 183 is configured in various embodiments to allocate power to the appliances based on the current priority and current power consumption of each appliance. Allocation may be by way of an operating command configured to fully or partially enable or disable operation of the appliance. For example, at time $T_{-3}$ in FIG. 5, the load manager prioritizes operation of the appliances in the order $A_2, A_1, A_4, A_3$. In some cases the prioritization will have no effect on the operation of the appliances. For example, when the aggregate power required to operate the appliances is less than a maximum permissible aggregate power assigned to the system 100, all the appliances may operate normally. On the other hand, if the aggregate power to fully operate all the appliances ($A_1 \ldots A_4$ in the current example) exceeds the assigned power maximum, the load manager 183 may completely disable operation of the appliance $A_3$. If the available power exceeds the power required to operate the remaining appliances, these appliances may operate normally. If the available power is insufficient, then the load manager may fully or partially disable operation of the appliance $A_4$.

In some embodiments the load manager 183 allocates power to the appliances 115 based on estimated future priority. For example, when an estimated future priority predicts the power requirement of a particular appliance will decline, the load manager 183 may allocate power to another appliance 115 earlier than would otherwise be the case. Conversely, if the estimated priority indicates the power requirement of the estimating appliance 115 will increase, the load manager 183 may defer allocating power to other appliances 115.

In some embodiments the load manager 183 allocates power to the appliances 115 based on an integral of the historical or estimated priority functions. For example, the appliances 115 may have a priority ranking based on total power consumption over a past or future time range. The load manager 183 may rank the appliances 115 by past or future integrated power consumption. The ranked integrals of the estimated priority functions may result in a different ranking of the appliances 115 than would be the case for priority based on the instantaneous power consumption. The different ranking may be indicative of a future change of ranking based on instantaneous power consumption by the appliances 115. The load manager may anticipate this change by allocating power to the appliances 115 based on the integrated estimated priority functions. The integration period is not limited to any particular value, but at least a 5 minute period is expected to provide the desired benefit. In some embodiments the integration period may be about one hour to provide longer range power consumption average, while in other embodiments the integration period may be 12 or 24 hours to provide a time average reflective of significant portions of a day.

In various embodiments, the load manager 183 considers all, or a selected subset of all possible combinations of the efficiency maps associated with concurrently operating appliances. The load manager 183 may determine a value that aggregates the priorities of the selected set of efficiency maps, and may select a combination of efficiency maps that provides a minimum aggregated value. The aggregate value may be, e.g. a simple average of the priority values, or a weighted average to reflect any desired weighting.

The aggregate value may be used as a proxy for the power consumed by the system 100 operating the appliances associated with the selected combination of efficiency maps. The minimum aggregate value may be determined over any desired time frame, e.g. 1, 2, 12 or 24 hours. The load manager 183 may select the combination of appliances that corresponds to the selected set of efficiency maps that results in the minimum aggregate value. The power allocation provided by the load manager 183 may be partial or complete. For example, the load manager 183 may select full power operation for some appliances, partial power operation for another group of appliances, and zero power (e.g. appliances completely disabled) for yet another group of appliances.

In an embodiment the load manager 183 limits the operating power of a variable speed stage motor to a nonzero value less than a maximum operating power of the motor. For example, the motor may drive a multi-stage compressor of an HVAC outdoor unit. By limiting the maximum power of the compressor, the load manager 183 may allow the HVAC system to continue to provide a service, e.g. cooling, while limiting the instantaneous power consumed by the HVAC system. In other nonlimiting examples, the speed of a fan motor or a pump motor may be limited while allowing that motor to continue to provide the associated service. Such embodiments may be particularly useful to limit the aggregated power consumption of the system 100 while allowing services to remain active.

In this manner the load manager 183 may operate the system 100 to achieve a targeted total power consumption over the selected time period. The target value may be imposed, e.g. by a homeowner to achieve energy economy, or by a utility to manage overall power consumption of a large number of power subscribers.

Figure 6:
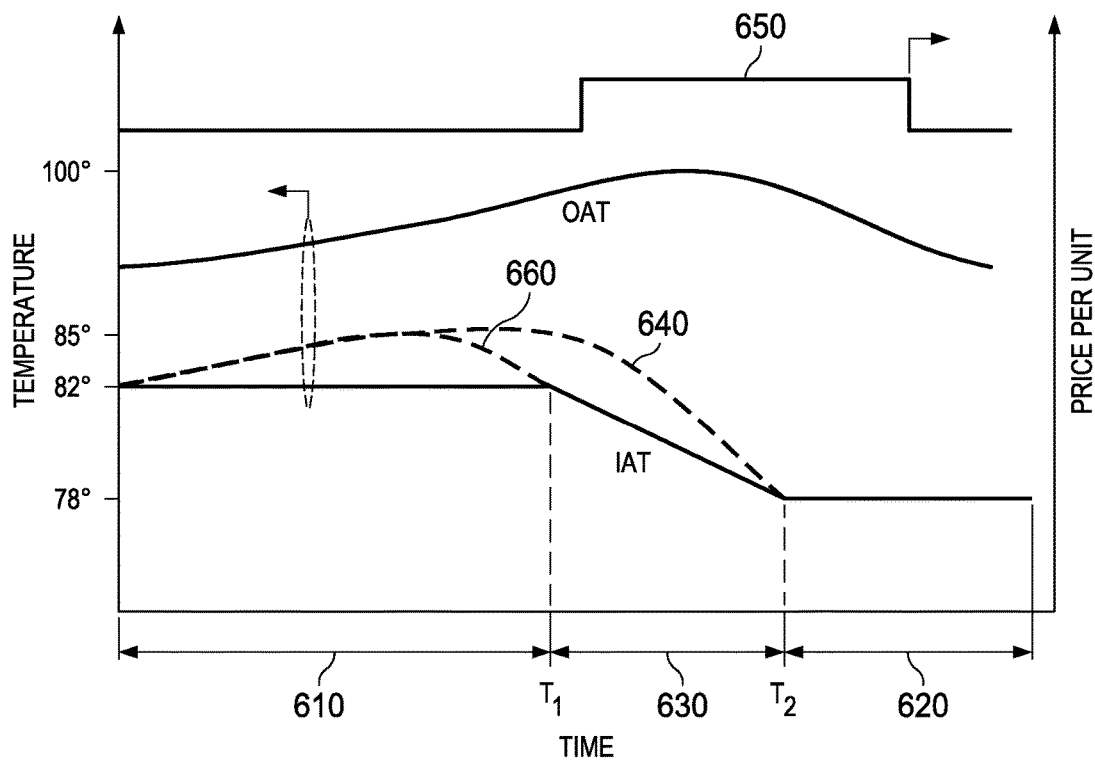
FIG. 6 illustrates aspects of an embodiment in which power is allocated, e.g. based on a prediction of cooling load on an HVAC system.

In various embodiments the load manager 183 looks ahead to predicted conditions to determine the relative priorities of appliances 115. In an illustrative case, FIG. 6 illustrates predicted OAT and a desired IAT for the conditioned space 190. The predicted outside air temperature may be obtained by the load manager 183, e.g. from a server via a wired or wireless internet connection. The desired IAT includes three segments. A segment 610 at 82° F. (~28° C.) covers a period prior to $T_1$. A segment 620 at 78° F. (~26° C.) covers a period after $T_2$. A segment 630 covers a transition period between $T_1$ and $T_2$ during which the load manager 183 may be programmed to reduce the IAT from 82° to 78°.

The OAT is illustrated as increasing over the illustrated time period to a maximum value at about 100° F. (~38° C.) and then falling. This profile may be representative of, e.g. the rise and fall of the OAT on a hot summer day. At any particular instant, the OAT curve represents a predicted OAT for a time range following that instant.

The load manager 183 may use the predicted OAT to weight the priority of the HVAC-related appliances when determining anticipated power loading by the system 100. In some embodiments the load manager 183 may take into account the cost of energy in determining a priority weighting. For example a temperature segment 640 may reflect an IAT rise due to a setback program running on the load manager 183. The load manager 183 may project a rise of the IAT based on a predicted OAT. For example, the load manager 183 may be programmed to provide a setback temperature while the structure 105 is unoccupied. The load manager 183 may be prepared to allow the IAT to rise to 85° F. (~29° C.) during a setback period. The load manager may be further configured to attain an IAT setpoint of 78° F. (~26° C.) at time $T_2$. Operating conventionally the load manager 183 might allow the IAT to follow a path described by the segment 640, in which the load manager 183 begins to reduce the IAT to a lower value beginning at $T_1$.

In contrast to conventional operation, in various embodiments the load manager 183 may take into account a cost function 650 when controlling the system 100. According to the cost function 650, the cost of the power received by the system 100 increases between $T_1$ and $T_2$. The load manager 183 may determine that the cost of reducing the IAT to 78° F. is lower if the load manager 183 limits the setback temperature to less than 85° F., begins reducing the IAT before $T_1$, or both. In an illustrative example, a segment 660 shows the IAT for such an embodiment. (In this case it is possible that the total power consumed by the system 100 is greater following the segment 660 than by following the segment 640, though the cost to the energy subscriber may be lower.) The load manager may control the system 100 to follow the segment 660 by, e.g. elevating the priority of the appliances 115 associated with the HVAC functions of the system 100. This prioritization may include reducing the priority of another appliance to stay within a power budget. For example, the operation of the refrigerator 170 may be deferred as long as the temperature within the refrigerator does not rise excessively. The load manager 183 may effectively lower the priority of such optional appliances 115 during the peak pricing period to reduce the aggregate cost of operating the system 100.

Figure 7A:
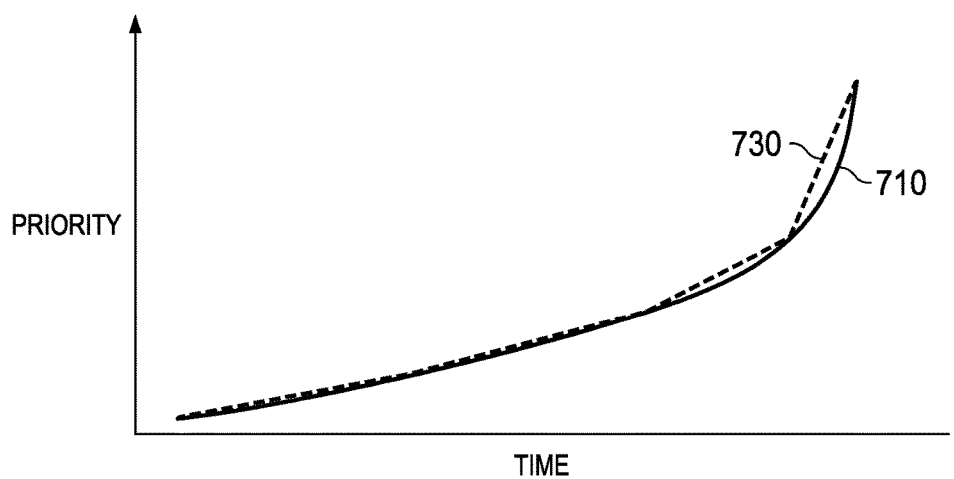
FIGS. 7A and 7B illustrate an illustrative and nonlimiting embodiment in which a forecast of operating priority and operating power is used to allocate power among various loads, e.g. to reduce the peak load demand within the structure of FIG. 1.
Figure 7B:
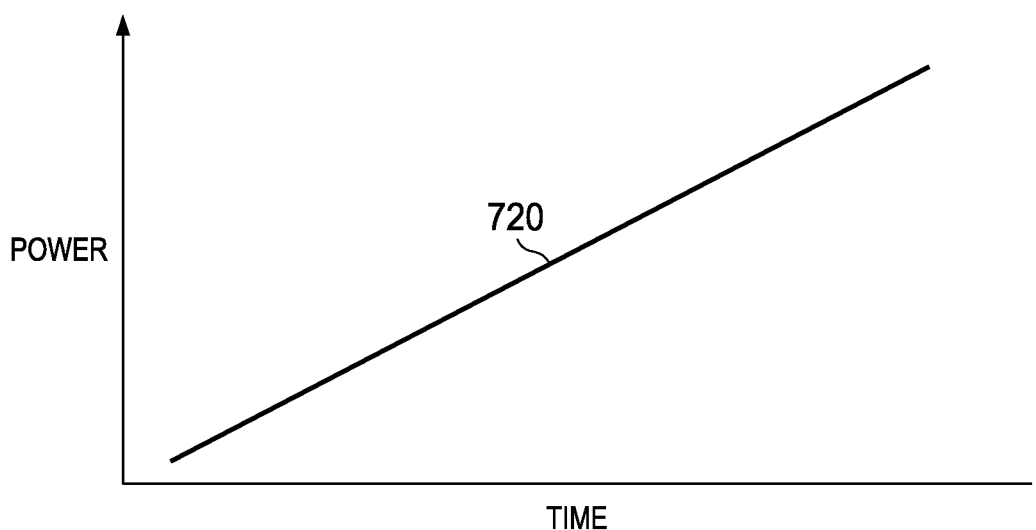

In some embodiments dynamic priority adjustment may include consideration of an estimated power associated with an estimated future priority. FIGS. 7A and 7B illustrate an example of related priority and power consumption. FIG. 7A illustrates a priority function 710, and FIG. 7B illustrates a corresponding power function 720. In one aspect the power function 720 may be viewed as an estimate of the power required by the corresponding appliance to meet the demand implied by the priority function 710. Thus, for example, an appliance 115 or the load manager 183 may determine that the priority function 710 is associated with the power function 720, e.g. by a stored parameter or historical performance data. The appliance 115 or the load manager 183 may determine a piecewise linear approximation of one or both the functions 710 and 720*m* as exemplified by a function 730. The piecewise linear approximation may be used as previously described to reduce communication and/or storage resources. (See FIG. 5.)

In various embodiments the future priority and/or the future power requirement of an appliance may be determined by extrapolation from a number of the most recent data points of actual priority and/or power consumption associated with that appliance. Without limitation the number of previous data points may be five, but embodiments are not limited thereto. The extrapolation may be updated regularly, e.g. every 5-10 minutes in some embodiments. Extrapolation may be by well-known techniques of fitting a polynomial curve, e.g. a second order polynomial, to the historical data. In some cases the resulting fit will yield an approximately linear extrapolation, while in other cases the fit may have significant curvature. The load manager 183 may be configured to truncate the extrapolation when the predicted values do not reflect physically realistic operating conditions.

In some embodiments one or more of the appliances 115 or load managers 183, 186 is configured to build a profile history. A profile history may include historical information regarding aspects of the performance of that or another device (e.g. an appliance or load manager) over a preceding period of time. For example, a profile history may include performance data for one week prior to the present time of operation. Performance data may include time of operation, power consumed by operation, zone of operation, cost of operations, and external data such as outside air temperature and humidity over the historical period.

In an embodiment one or more of the appliances 115 or load managers 183, 186 is configured to select a combination of performance factors based on a historical weather record. For example, the weather of a current day of operation may be similar to the weather of a recent day of operation. Similarity may include temperature, humidity, time of highest temperature, or energy pricing at one or more times of the day. Thus, the system 100 may benefit from performance optimization determined under similar conditions of the earlier period. Performance optimization may include modifying the operating priority of one or more appliance from the value that appliance or those appliances would otherwise have absent consideration of the weather history. Such use of historical data does not preclude the further optimization of performance in the current operation.

Performance optimization may include integration of a function that describes a performance characteristic. For example, a function may be determined that describes efficiency of operation over a range of temperatures. The load manager 183, e.g., may determine a figure of merit describing operation of the system 100 by integrating the function that describes the efficiency of operation of one or more appliances 115 in the temperature conditions of operation. The integration limits may define a particular time period of operation.

Figure 8:
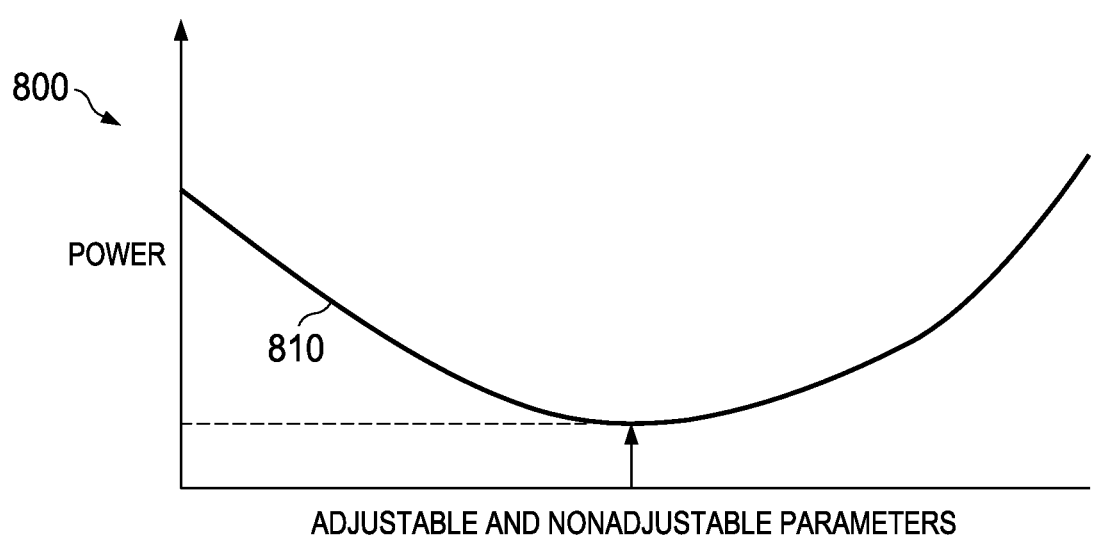
FIG. 8 illustrates an efficiency map of an appliance of FIG. 1 in one nonlimiting embodiment.

Efficiency of operation may be expressed as an efficiency map. FIG. 8 illustrates an example of an efficiency map 800, simplified for ease of visualization. In various embodiments the load manager 183 computes the efficiency map 800 for a plurality of appliances 115, and in some cases all of the appliances 115, in the system 100. The computation may take into account the various factors discussed herein that influence the power consumption associated with the operation of the appliances. A characteristic 810 describes a power metric, e.g. predicted power over the next 24 hours, as a function of a parameter space that includes, e.g. the predicted priorities of the appliance over the computation time window. The power characteristic 810 is expected to have a local minimum at some combination of performance variables.

Efficiency may be with respect to, e.g., instantaneous power use or monetary cost of operation or average power use or monetary cost over any time period. Any of the appliances or load managers 183 may produce and/or locally store an efficiency map in local volatile or nonvolatile memory. An efficiency map may express efficiency in terms of one or more variables to which the efficiency is responsive. When only one variable is used, the efficiency map may be expressed as a plot of the efficiency vs. the one variable in an X-Y plot. When two variables are used, the efficiency map may appear as a response surface of the efficiency as a function of the two variables. The efficiency may be expressed as three or more variables as well, though visualization is typically more difficult. A forecast efficiency may be determined for a combination of variables as determined by the specific variable space of the model. A different efficiency map may pertain to each appliance, to each of the conditioned spaces 190, 195, or to a constellation of appliances 115. A constellation is a group of appliances configured to operate together as a cohesive unit, such as the compressor motor 115*a*, fan motor 115*b* and blower motor 115*e* operating as an HVAC system.

In various embodiments, the load manager 183 considers all, or a selected subset of all possible combinations of the efficiency maps associated with concurrently operating appliances 115. The load manager 183 may determine a value that aggregates the priorities of the selected set of efficiency maps, and select a combination of efficiency maps that provides a minimum aggregated value. The aggregate value may be, e.g. a simple average of the priority values, or a weighted average to reflect any desired weighting.

The aggregate value may be used as a proxy for the power consumed by the system 100 operating the appliances 115 associated with the selected combination of efficiency maps. The minimum aggregate value may be determined over any desired time frame, e.g. 1, 2, 12 or 24 hours. The load manager 183 may select the combination of appliances 115 that corresponds to the selected set of efficiency maps that results in the minimum aggregate value. The power allocation provided by the load manager 183 may be partial or complete. For example, the load manager 183 may select full power operation for some appliances 115, partial power operation for another group of appliances 115, and zero power (e.g. appliances 115 completely disabled) for yet another group of appliances 115.

In this manner the load manager 183 may operate the system 100 to achieve a targeted total power consumption over the selected time period. The target value may be imposed, e.g. by a homeowner to achieve energy economy, or by a utility to manage overall power consumption of a large number of power subscribers.

In an embodiment, one or more of the appliances 115 may determine (e.g. via an instance of the local load manager 151) if that appliance 115 is competitive with the operation of another appliance 115 for efficiency of operation. For example, if the unit 110 is a heat pump system, the compressor motor 115a may obtain an efficiency map from the furnace 115f and compare the two maps. If the compressor motor 115a determines that the overall efficiency of the system 100 would be greater if the compressor 115a operates to heat the structure 105, instead of the furnace 115f, then the compressor motor 115a may reduce its own priority level below that of the furnace 115f to allow the furnace 115f to operate. Each of the appliances 115 may be configured to engage in such a prioritization dialog, in which the appliances 115 share efficiency information in the form of the efficiency maps to modify their priority levels to cooperatively increase the efficiency of the system 100. This cooperative negotiation may include operation of the load managers 183, 186 and/or one or more instances of the local load manager 151. For example the load managers 183, 186 may perform the efficiency map comparisons and assign priorities to the appliances 115 in the system 100, or mediate the communication of the appliances 115 to effect a negotiation dialog between the appliances 115.

Each appliance 115 may employ one or more forecasts when modifying or evaluating its associated efficiency map. For example, a particular appliance 115 may receive a forecast of temperature, humidity or energy cost. The forecast may be for any future time, but the forecast over the time period of the efficiency managed by the appliance 115 may be most relevant.

In some embodiments an appliance 115 is configured to respond to a query from another appliance 115 or one of the load managers 183, 186 by returning an efficiency map that reflects a predicted efficiency. For example, the load manager 183 may be programmed to change a control setpoint of the system 100 at a particular time of day, e.g. 5:00 PM. At a time before 5:00 PM the load manager 183 may issue to each of the compressor motors 115a and 115c a request to return an efficiency map that describes the predicted efficiency of each compressor motors 115a and 115c at 5:00 PM. The compressor motors 115a and 115c may then obtain a forecast of temperature and humidity at 5:00 PM, update each respective efficiency map, and return the efficiency maps to the load manager 183. The load manager 183 may then prioritize operation of the compressor motors 115a and 115c, taking into consideration the efficiency maps returned by the compressor motors 115a and 115c. In some embodiments the efficiency map reflects a time range, such as a setback period or an evening period during which the structure 105 is occupied.

In various embodiments described herein, it is an objective to manage the operation of the various appliances to reduce energy cost or total power consumed by the system 100 while maintaining a comfortable environment within the structure 105. The sharing of predictive efficiency maps among the various appliances and the load managers 183, 186 provides for dynamic optimization of the interrelated operation of the appliances 115 to achieve the objective of greater efficiency.

In another example, the load manager 183 may iteratively determine a power allocation solution. The load manager 183 may acquire the predicted efficiency maps from at least some and preferably all of the appliances 115 and calculate a load balance of the appliances 115 based on predicted loads and efficiencies. The load manager then distributes to each appliance 115 a power allotment over time. Each appliance 115 may recalculate its efficiency map for its allocated power condition. The load manager 183 may then acquire the new efficiency maps, recalculate the power allotments and again distribute the power allotments to the appliances 115. This cycle may repeat until the difference of calculated aggregate load of the system 100 between successive iterations is minimized and falls below a predefined threshold. Such iterative operation may be a background process so that the load manager 183 constantly employs updated information, e.g. weather, energy cost, and demand patterns, to actively seek a minimum power consumption, or cost, while providing desired and essential services to the structure 100.

Figure 9:
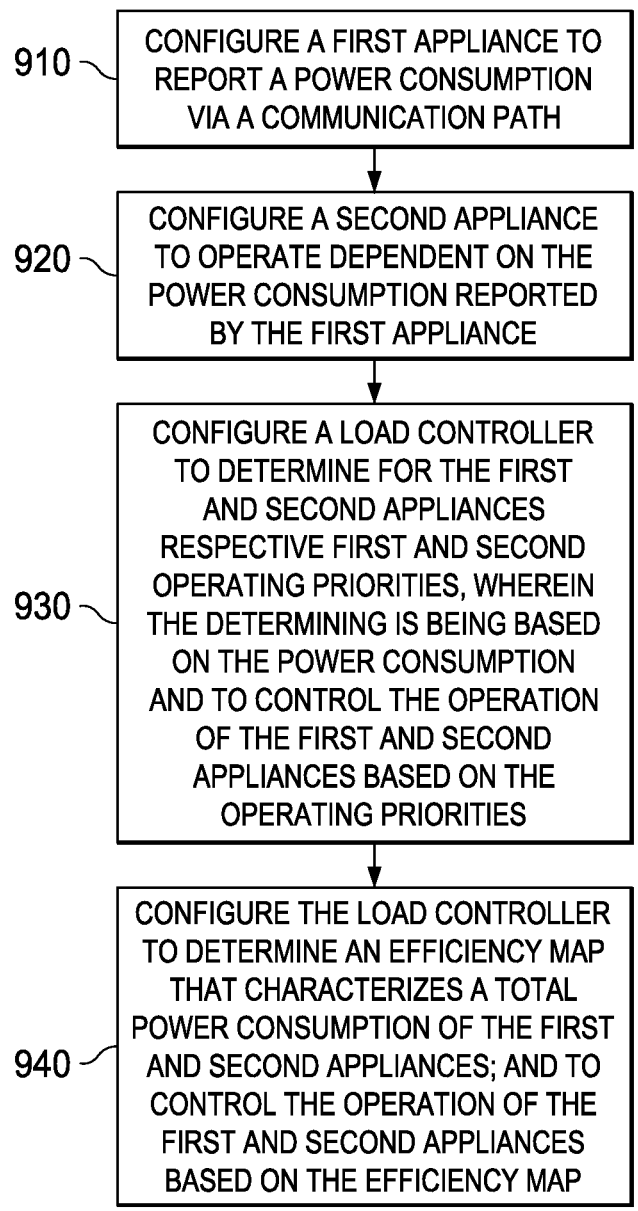
FIG. 9 presents a method of the disclosure, e.g. for manufacturing the system of FIG. 1.

Turning now to FIG. 9, a method 900 of the disclosure is presented, e.g. for manufacturing a network of appliances such as the system 100. The method 900 is described without limitation in terms of the previously described features, e.g. in FIGS. 1-8. The steps of the method 900 may be performed in an order other than the illustrated order.

In a step 910 a first appliance is configured to report a power consumption via a communication path. In a step 920 a second appliance is configured to operate dependent on the power consumption reported by the first appliance.

The above embodiment may include a step 930. In the step 930 a load controller is configured to determine for the first and second appliances respective first and second operating priorities. The determining is based on the power consumption. The load controller is further configured to control the operation of the first and second appliances based on the operating priorities.

In the above embodiment the load controller may determine the first or second priority based on a predicted outside air temperature.

Some of the above embodiments may include a step 940 in which the load controller is further configured to 1) determine an efficiency map that characterizes a total power consumption of the first and second appliances; and 2) control the operation of the first and second appliances based on the efficiency map.

In some of the above embodiments the load controller may consider a cost of the power in determining the operating priorities.

In any of the above embodiments the first or second operating priority may be is determined to prevent the first and second appliances from exceeding a maximum aggregate power consumption.

In any of the above embodiments at least one of the first and second appliances may be a heating, ventilating and air conditioning system component.

In any of the above embodiments at least one of the first and second appliances may be a resistive load.

Those skilled in the art to which this application relates will appreciate that other and further additions, deletions, substitutions and modifications may be made to the described embodiments.

What is claimed is:

1. A system for controlling operation of a plurality of appliances, comprising:
   a first appliance configured to report a power consumption via a network;
   a second appliance configured to operate dependent on said power consumption reported by said first appliance; and
   a load controller configured to:
      determine for said first and second appliances, respective first and second operating priorities, said determining being based on an integral of historical or future priority functions associated with each of said first and second appliances, wherein said determination allows the load controller to estimate future operating priorities for said first and second appliances;
      utilize a cost function to determine cost of power received during different time periods and lower the operating priorities during peak pricing periods to reduce cost of operating the system;
      control the operation of said first and second appliances based on said operating priorities;
      communicate with the first and second appliances, the communication allowing dynamic optimization of interrelated operation of the first and second appliances for greater efficiency; and
   wherein the first and second appliances are incorporated within a residential structure.

2. The system as recited in claim 1, wherein at least one of said first and second appliances is a heating, ventilating and air conditioning system component.

3. The system as recited in claim 1, wherein at least one of said first and second appliances is a resistive load.

4. The system as recited in claim 1, wherein said load controller determines said first or second priority based on a predicted outside air temperature.

5. The system as recited in claim 1, wherein said load controller is further configured to:
   determine an efficiency map that characterizes a total power consumption of said first and second appliances; and
   control the operation of said first and second appliances based on said efficiency map.

6. The system as recited in claim 1, wherein said first or second operating priority is determined to prevent said first and second appliances from exceeding a maximum aggregate power consumption.

7. A method of manufacturing a network of appliances, comprising:
   configuring a first appliance to report a power consumption via a communication path;
   configuring a second appliance to operate dependent on said power consumption reported by said first appliance; and
   configuring a load controller to:
      determine for said first and second appliances, respective first and second operating priorities, said determining being based on an integral of historical or future priority functions associated with each of said first and second appliances, wherein said determination allows the load controller to estimate future operating priorities for said first and second appliances;
      utilize a cost function to determine cost of power received during different time periods and lowering the operating priorities during peak pricing periods to reduce cost of operation;
      control the operation of said first and second appliances based on said operating priorities;
      communicate with the first and second appliances, the communication allowing dynamic optimization of interrelated operation of the first and second appliances for greater efficiency; and
   wherein the first and second appliances are incorporated within a residential structure.

8. The method as recited in claim 7, wherein at least one of said first and second appliances is a heating, ventilating and air conditioning system component.

9. The method as recited in claim 7, wherein at least one of said first and second appliances is a resistive load.

10. The method as recited in claim 7, further comprising configuring said load controller to:
    determine an efficiency map that characterizes a total power consumption of said first and second appliances; and
    control the operation of said first and second appliances based on said efficiency map.

11. The method as recited in claim 7, wherein said first or second operating priority is determined to prevent said first and second appliances from exceeding a maximum aggregate power consumption.

12. A load controller for controlling a networked plurality of appliances, comprising:
    a processor configured to execute program instructions stored by a program memory;
    a priority calculation module defined by said program instructions that is configured to:
       calculate operating priorities of first and second networked appliances, said calculation of operating priorities being based on an integral of historical or future priority functions, wherein the priority functions are associated with each of said first and second appliances, wherein said calculation allows the load controller to estimate future operating priorities for said first and second appliances; and
       utilize a cost function to determine cost of power received during different time periods and lower the operating priorities during peak pricing periods to reduce cost of operation;
    said processor being further configured to control the operation of said first and second networked appliances based on said operating priorities;
    wherein the processor of the load controller is configured to communicate with the first and second networked appliances, the communication allowing dynamic optimization of interrelated operation of the first and second networked appliances for greater efficiency; and
    wherein the first and second appliances are incorporated within a residential structure.

13. The load controller as recited in claim 12, wherein at least one of said first and second appliances is a heating, ventilating and air conditioning system component.

14. The load controller as recited in claim 12, wherein at least one of said first and second appliances is a resistive load.

15. The load controller as recited in claim 12, wherein said priority calculation module determines said first or second priority is further based on a predicted outside air temperature.

16. The load controller as recited in claim 12, wherein said priority calculation module is further configured to determine an efficiency map that characterizes a total power consumption of said first and second appliances, and said load controller is configured to control the operation of said first and second appliances based on said efficiency map.

17. The load controller as recited in claim 12, wherein said operating priorities are determined to prevent said first and second appliances from exceeding a maximum aggregate power consumption.

18. The load controller as recited in claim 12, wherein said control includes limiting an operating power of a variable speed motor to a nonzero power less than full operating power.

* * * * *

UNITED STATES PATENT AND TRADEMARK OFFICE
CERTIFICATE OF CORRECTION

| | |
|---|---|
| PATENT NO. | : 9,906,029 B2 |
| APPLICATION NO. | : 13/326644 |
| DATED | : February 27, 2018 |
| INVENTOR(S) | : Wojciech Grohman |

It is certified that error appears in the above-identified patent and that said Letters Patent is hereby corrected as shown below:

In the Specification

Column 1, Line 33        Replace "power demands on a power gird grid," with
-- power demands on a power grid, --

Signed and Sealed this
First Day of May, 2018

Andrei Iancu
*Director of the United States Patent and Trademark Office*